(12) United States Patent
Motoki et al.

(10) Patent No.: US 9,530,134 B2
(45) Date of Patent: *Dec. 27, 2016

(54) AUTHENTICATION ON MOBILE DEVICE USING TWO-DIMENSIONAL CODE

(71) Applicant: International Business Machines Corporation, Armonk, NY (US)

(72) Inventors: Toshiyasu Motoki, Zama (JP); Dan Tateno, Tokyo (JP)

(73) Assignee: International Business Machines Corporation, Armonk, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 15/046,501

(22) Filed: Feb. 18, 2016

(65) Prior Publication Data

US 2016/0162898 A1 Jun. 9, 2016

Related U.S. Application Data

(63) Continuation of application No. 14/806,955, filed on Jul. 23, 2015.

(30) Foreign Application Priority Data

Aug. 7, 2014 (JP) .................................. 2014-161278

(51) Int. Cl.
| | |
|---|---|
| *G06K 5/00* | (2006.01) |
| *G06Q 20/40* | (2012.01) |
| *G06Q 20/32* | (2012.01) |
| *G06Q 20/38* | (2012.01) |

(52) U.S. Cl.
CPC ...... *G06Q 20/4014* (2013.01); *G06Q 20/3274* (2013.01); *G06Q 20/3276* (2013.01); *G06Q 20/382* (2013.01)

(58) Field of Classification Search
CPC ...... G07F 7/1008; G06Q 20/341; G06Q 30/02
USPC ............................. 235/375, 380, 382, 382.5
See application file for complete search history.

(56) References Cited

U.S. PATENT DOCUMENTS

2015/0269565 A1* 9/2015 Inotay .................. G06Q 20/354
235/380

FOREIGN PATENT DOCUMENTS

| JP | 2006107085 A | 4/2006 |
|---|---|---|
| JP | 2006209852 A | 8/2006 |
| JP | 3921489 B2 | 5/2007 |
| JP | 2008071233 A | 3/2008 |
| JP | 4783150 B2 | 9/2011 |

(Continued)

OTHER PUBLICATIONS

JP Application 2014-161278, entitled "Authentication on Mobile Device Using Two-Dimensional Code", filed Aug. 7, 2014, 27 pages.

(Continued)

*Primary Examiner* — Karl D Frech
(74) *Attorney, Agent, or Firm* — Laura E. Gisler

(57) ABSTRACT

A two-dimensional code generated from encrypted original authentication data can be displayed on an authentication device. The code is read and decrypted by an authentication application on a mobile device. This can generate and display a new two-dimensional code. The new code can contain additional information, and the new two-dimensional code is read by the two-dimensional code reading unit of an authentication device. It is then authenticated.

4 Claims, 9 Drawing Sheets

(56) References Cited

FOREIGN PATENT DOCUMENTS

JP 2011205220 A 10/2011
JP 4915464 B2 4/2012

OTHER PUBLICATIONS

Motoki et al., "Authentication on Mobile Device Using Two-Dimensional Code", U.S. Appl. No. 14/806,955, filed Jul. 23, 2015.
List of IBM Patents or Patent Applications Treated as Related, dated Feb. 15, 2016, pp. 1-2.
Unknown, "Open Source QR Code Library", http://qrcode.osdn.jp/. pp. 1-4. Printed Jun. 4, 2015.

\* cited by examiner

AUTHENTICATION ON MOBILE DEVICE USING TWO-DIMENSIONAL CODE

CROSS REFERENCE TO RELATED APPLICATION

This application claims priority to Japanese Patent Application No. 2014161278, filed Aug. 7, 2014, which is incorporated herein in its entirety.

BACKGROUND

The present disclosure relates to authentication, and more specifically, to personal authentication of a user. In the existing technology related to personal authentication for payments and admission, a two-dimensional code for authentication (such as a QR code) is sometimes provided in advance as an image when the user registration process has been completed.

During payment or admission, authentication of the user is performed by having an authentication device including a two-dimensional code reading unit read the two-dimensional code provided in advance.

SUMMARY

Embodiments of the present disclosure may be directed toward a method for authenticating an application. Original authentication data may be accessed from an authentication server. The data may be encrypted to generate a first image. The first image may be a first two-dimensional code image. The system can display on a display unit the first image. The first image may also be configured to be read by a mobile device. A second image may be read from the mobile device. The second image may be a second two-dimensional code image that may be generated by an authentication application in response to the authentication application having decrypted the first image. The authentication application may have combined data from the decrypted first image with registered user information. It may be determined that the second image includes the original authentication data and also determined that the registered user information in the second image matches server registered user information from a user registration server.

Embodiments of the present disclosure may be directed toward a system. The system may comprise an authentication device and an authentication server and may be configured to perform steps that include accessing original authentication data from an authentication server. The data may be encrypted to generate a first image. The first image may be a first two-dimensional code image. The system can display on a display unit the first image. The first image may also be configured to be read by a mobile device. A second image may be read from the mobile device. The second image may be a second two-dimensional code image that may be generated by an authentication application in response to the authentication application having decrypted the first image. The authentication application may have combined data from the decrypted first image with registered user information. It may be determined that the second image includes the original authentication data and also determined that the registered user information in the second image matches server registered user information from a user registration server.

The above summary is not intended to describe each illustrated embodiment or every implementation of the present disclosure.

BRIEF DESCRIPTION OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
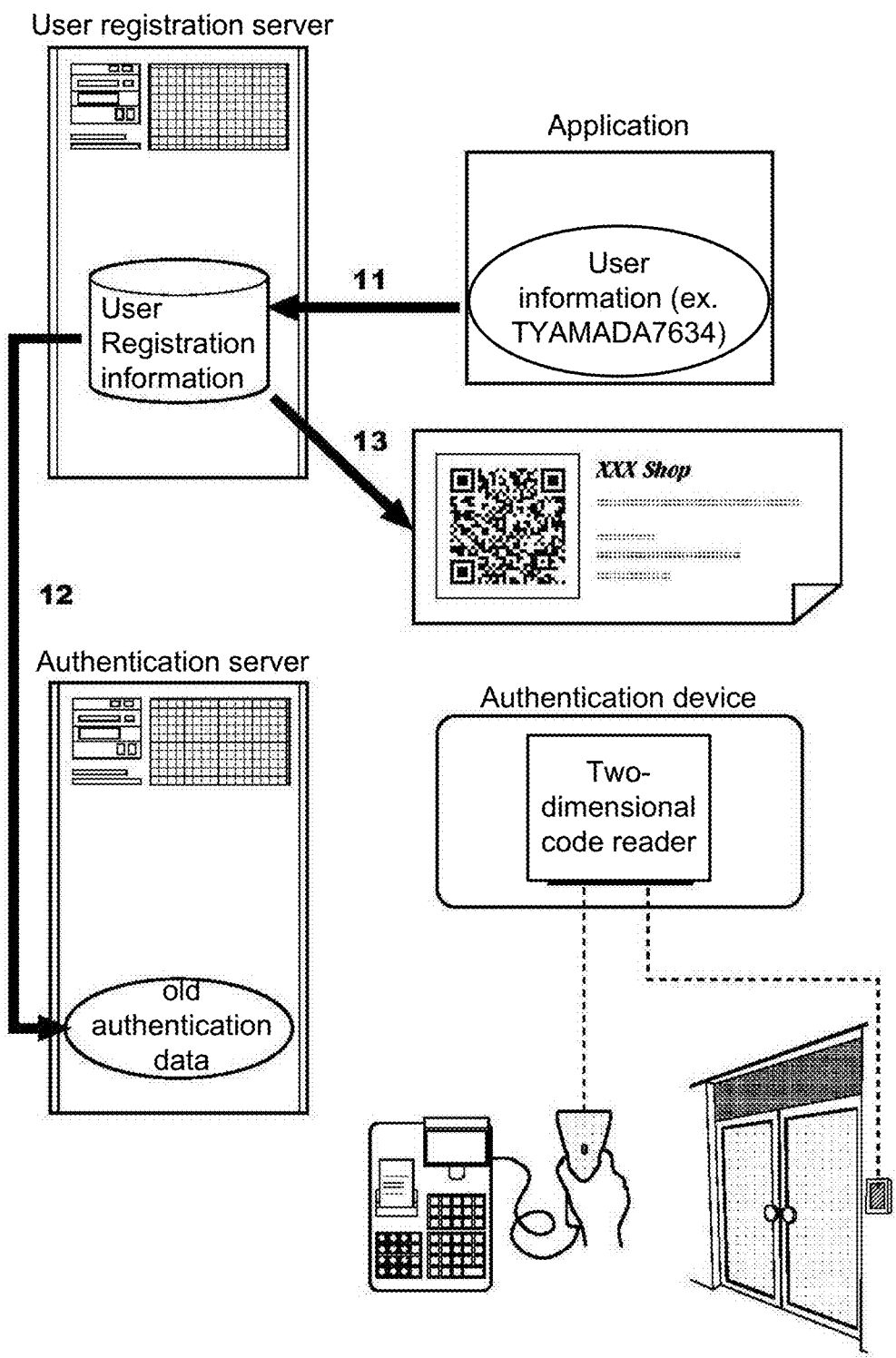
FIG. 1 shows an example of a procedure for receiving a two-dimensional code (e.g., a QR code) for authentication as an image when the user registration procedure has been completed.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

FIG. 1 shows an example of the procedure for receiving a two-dimensional code (such as a Quick Response "QR" code) for authentication as an image when the user registration procedure has been completed. In 11, user information (for example, "TYAMADA7634") is registered on a user registration server via an application. In 12, the user registration information is stored on an authentication server as original authentication data. The user registration server and the authentication server can be integrated into the same server. In 13, a two-dimensional code for authentication (such as a QR code) is provided in advance as an image. The two-dimensional code for authentication is then printed out on paper or a screen shot of the code is displayed on a computer display.

Figure 2:
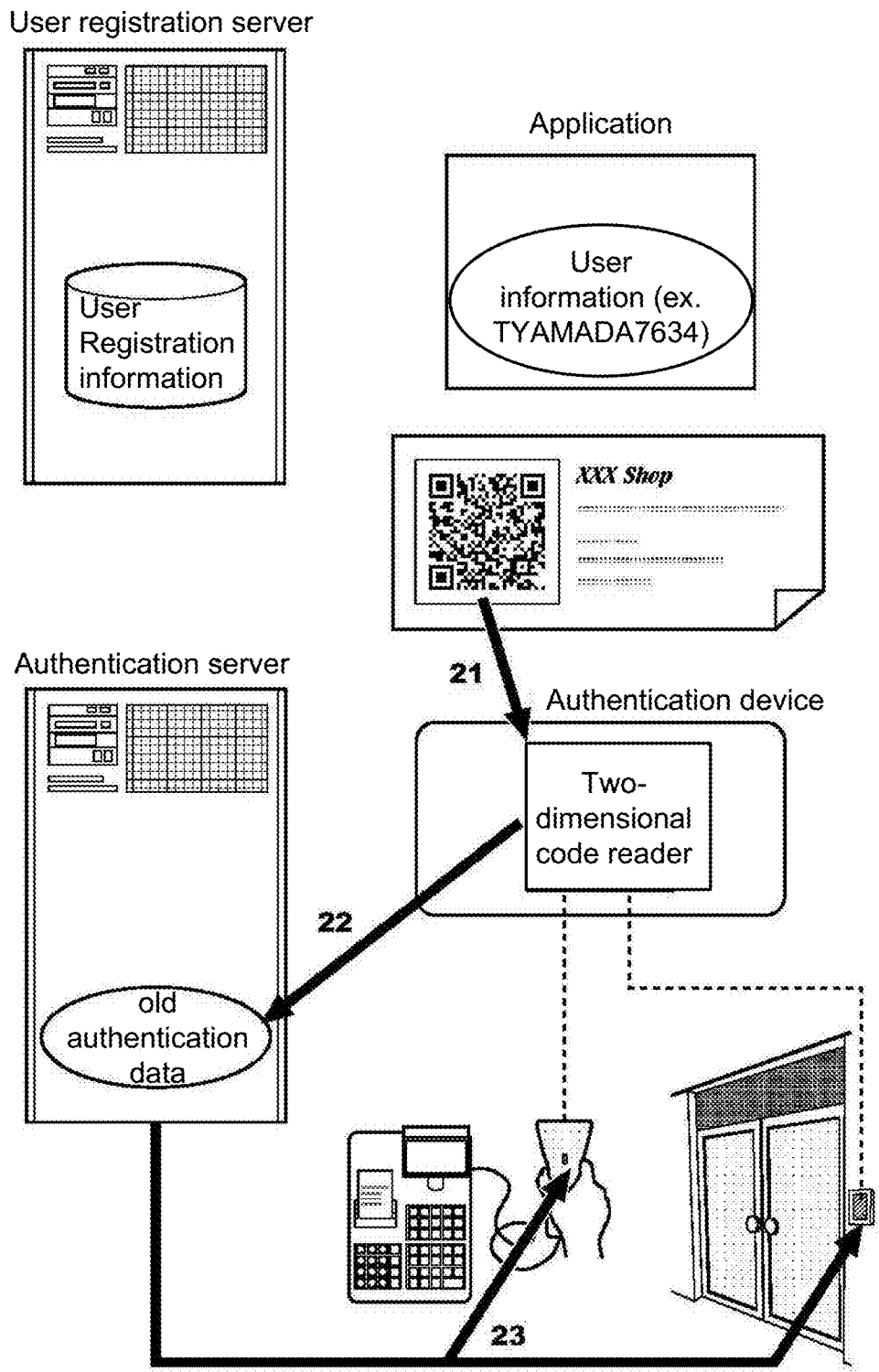
FIG. 2 shows an example of a procedure for authenticating a person when, for example, admission has been paid by having an authentication device with a two-dimensional code reading unit read a two-dimensional code.

FIG. 2 shows an example of the procedure for authenticating a person when, for example, admission has been paid by having an authentication device with a two-dimensional code reading unit read a two-dimensional code. In 21, the provided two-dimensional code is read by an authentication device with a two-dimensional code reading unit. In 22, the two-dimensional code is deciphered by the authentication device, sent to the authentication server, and matched against the stored original authentication data. In 23, when there is a match, a payment is completed or a door opens for admission. The authentication device and the authentication server can be integrated into a single system. The authentication device may include only a two-dimensional code reading unit, and the deciphering of the two-dimensional code may be performed by the authentication server. However, there are security risks with this technique as a screen shot or printout of the provided two-dimensional code may be stolen or passed on to a third party.

It is an object of the present disclosure to enable personal authentication using a secure two-dimensional code. Therefore, the present invention can be applied to one-time personal authentication.

In the present disclosure, a two-dimensional code which is generated from encrypted original authentication data is displayed on the two-dimensional code displaying unit of an authentication device is read once by an authentication application on a mobile device. This is decrypted, a new two-dimensional code is generated and displayed with required information added, and the new two-dimensional code is read by the two-dimensional code reading unit of an authentication device and authenticated.

The original authentication data is updated each time the authentication process has been completed, and is encrypted in each case to serve as the new two-dimensional code to be displayed on the two-dimensional code displaying unit of the authentication device.

Figure 3:
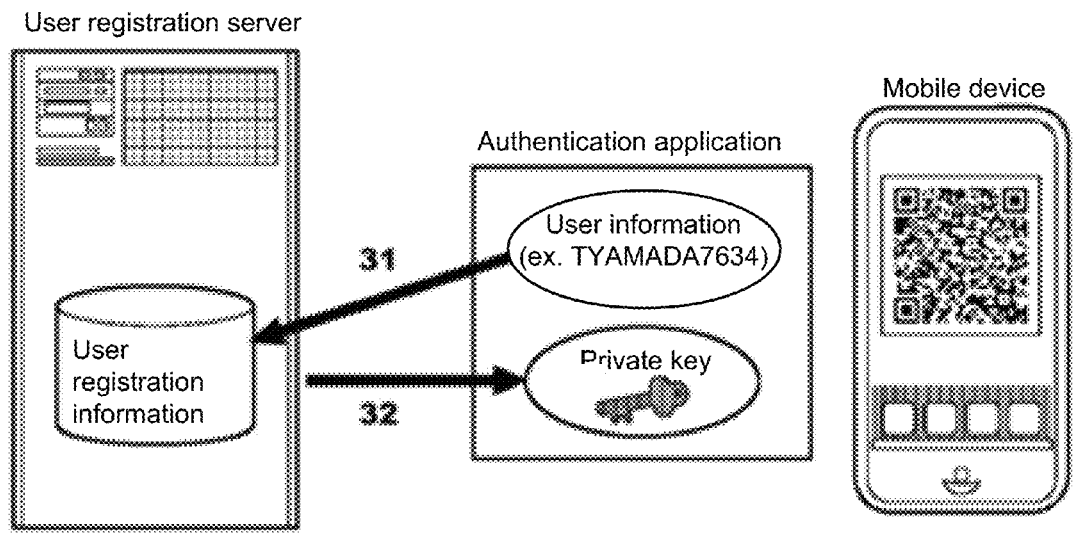
FIG. 3 shows an example of the procedure in the present disclosure for the registration process.
Figure 3:
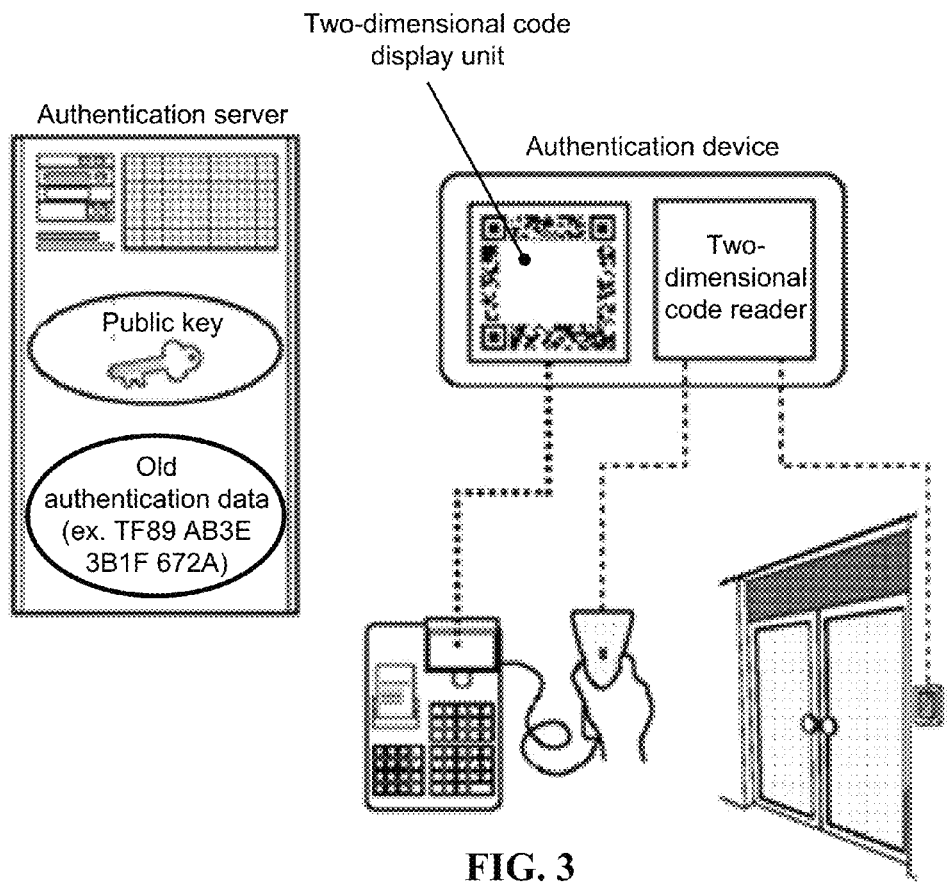

The following is a procedure in the present invention. FIG. 3 shows an example of the procedure in the present invention for the registration process. In 31, the user accesses a user registration server using an authentication application on a mobile device, and completes the registration process. In 32, when the registration process has been completed, the authentication application obtains a private key from the user registration server. The authentication application may be software uploaded to the mobile device, or may be in a separate unit from the mobile device which can be operated by the user from the mobile device (via communication, etc.).

Figure 4:
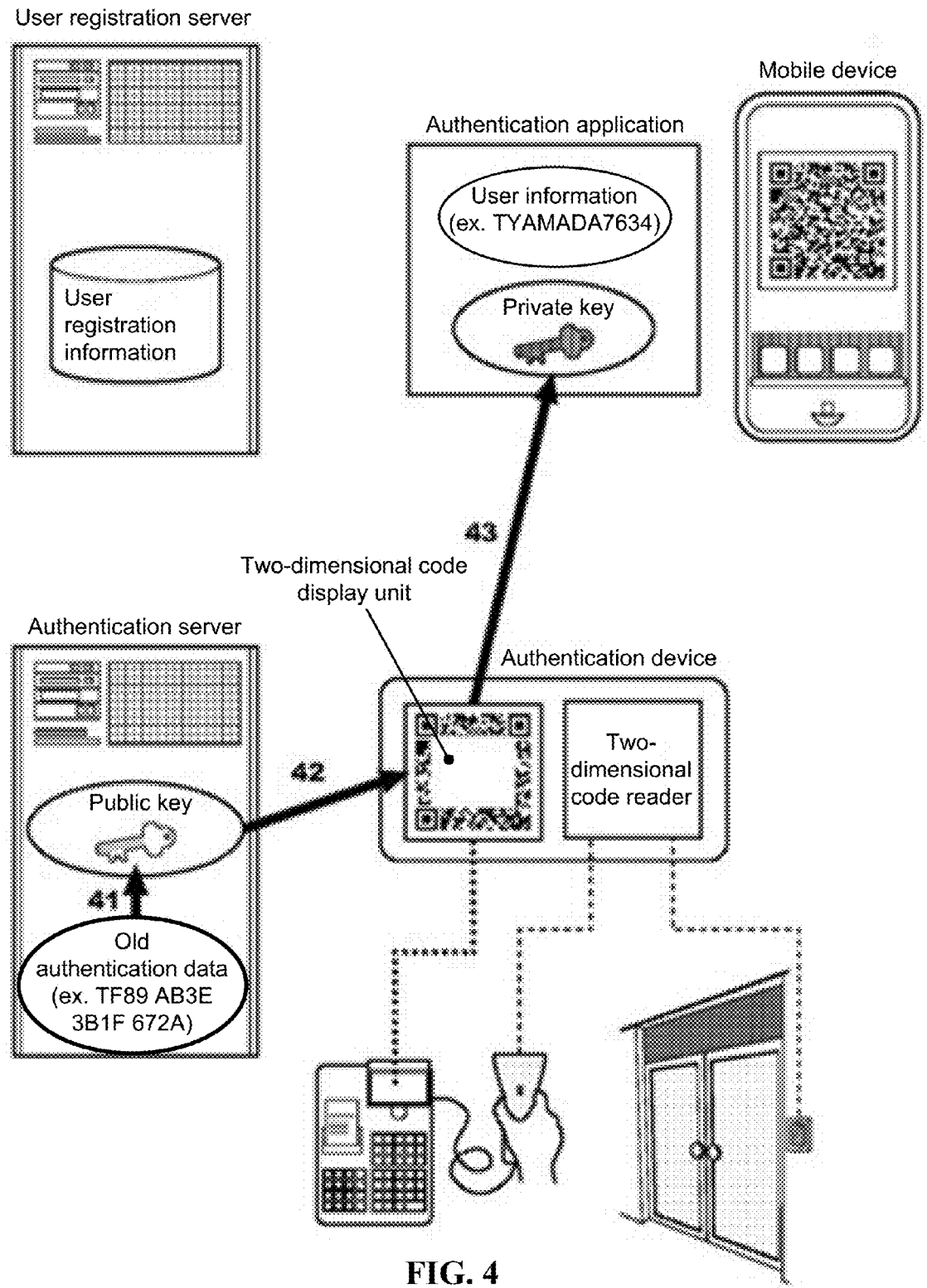
FIG. 4 shows an example of the procedure in the present disclosure for reading two-dimensional code A.

FIG. 4 shows an example of the procedure in the present disclosure for reading two-dimensional code A. The authentication device includes a "two-dimensional code displaying unit" with a screen for displaying a two-dimensional code (two-dimensional code A), and a "two-dimensional code reading unit" (a reader for reading two-dimensional code B). The screen can be, but is not limited to, a liquid crystal display. In 41, the authentication server encrypts any original authentication data (the original authentication data) using a public key (shared key). In 42, two-dimensional code A is generated. The original authentication data is updated each time the authentication process has been completed, and is encrypted in each case using a public key (shared key) to serve as the new two-dimensional code A to be displayed. In 43, the user launches the authentication application on the mobile device (or operates the authentication application using the mobile device), and reads two-dimensional code A using the two-dimensional code reading function. The mobile device may be any type of mobile phone that includes a standard two-dimensional code reading function (enabling two-dimensional codes to be deciphered) or imaging function.

Figure 5:
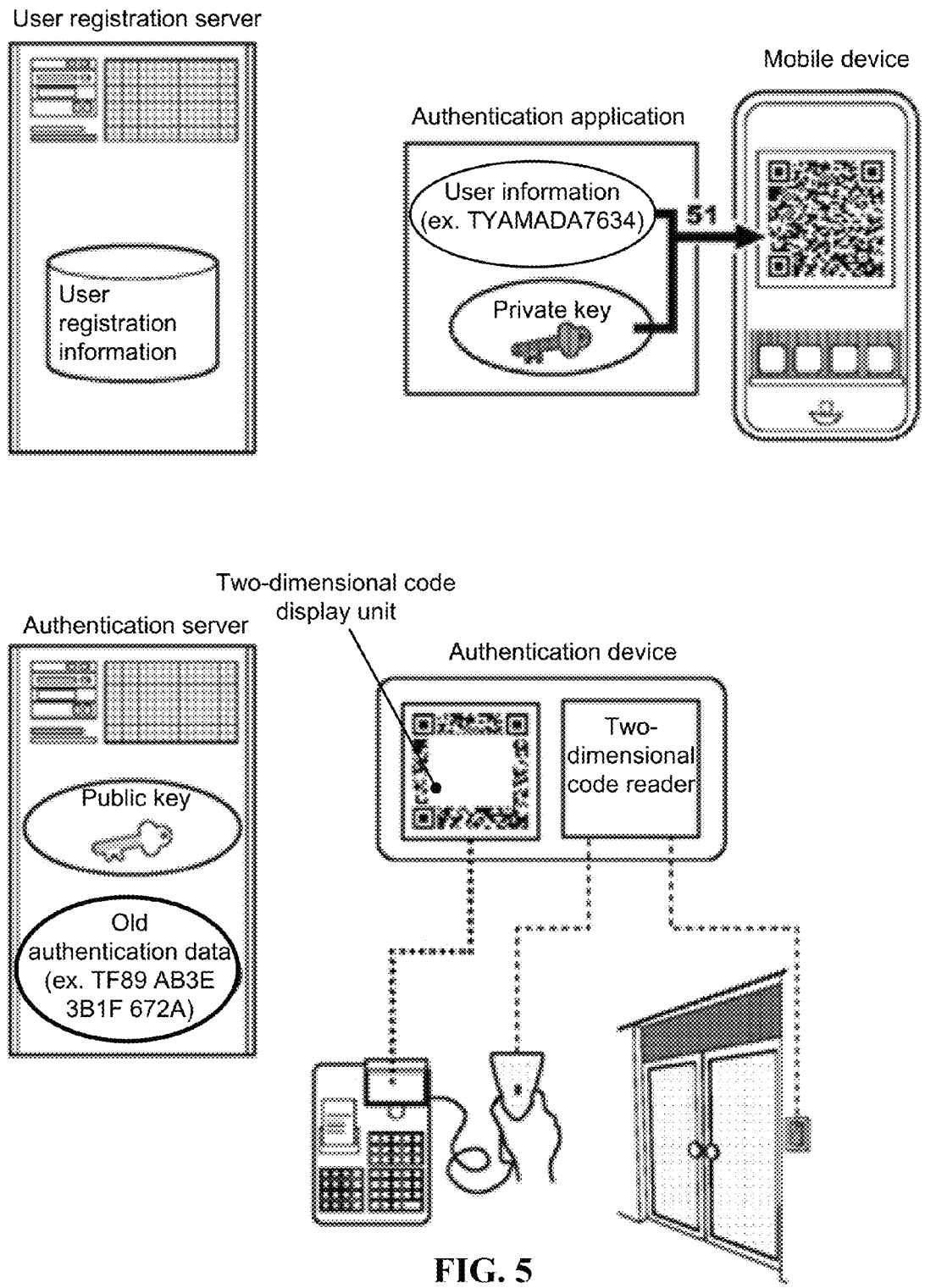
FIG. 5 shows an example of the procedure in the present disclosure for generating a new two-dimensional code (e.g., two-dimensional code B).

FIG. 5 shows the procedure in the present disclosure for generating a new two-dimensional code (two-dimensional code B). In 51, the authentication application decrypts the two-dimensional code A using a private key, combines the decrypted code with user information stored in the authentication application to generate a new two-dimensional code (two-dimensional code B), and displays the new code on the liquid crystal screen of the mobile device. The code may be combined with user information to generate a new code. An example of such a combination is authentication data in the form of a random string of 16-byte numbers, and user information in the form of a user ID. When the former is "7F89 AB3E 3B 1C 672A" and the latter is "TYAMADA7634", a combined string of 7F89 AB3E 3B 1C 672A TYAMADA7634 can be rendered as a new two-dimensional code to serve as two-dimensional code B. The "combination" is positioned to "prepare for authentication".

Figure 6:
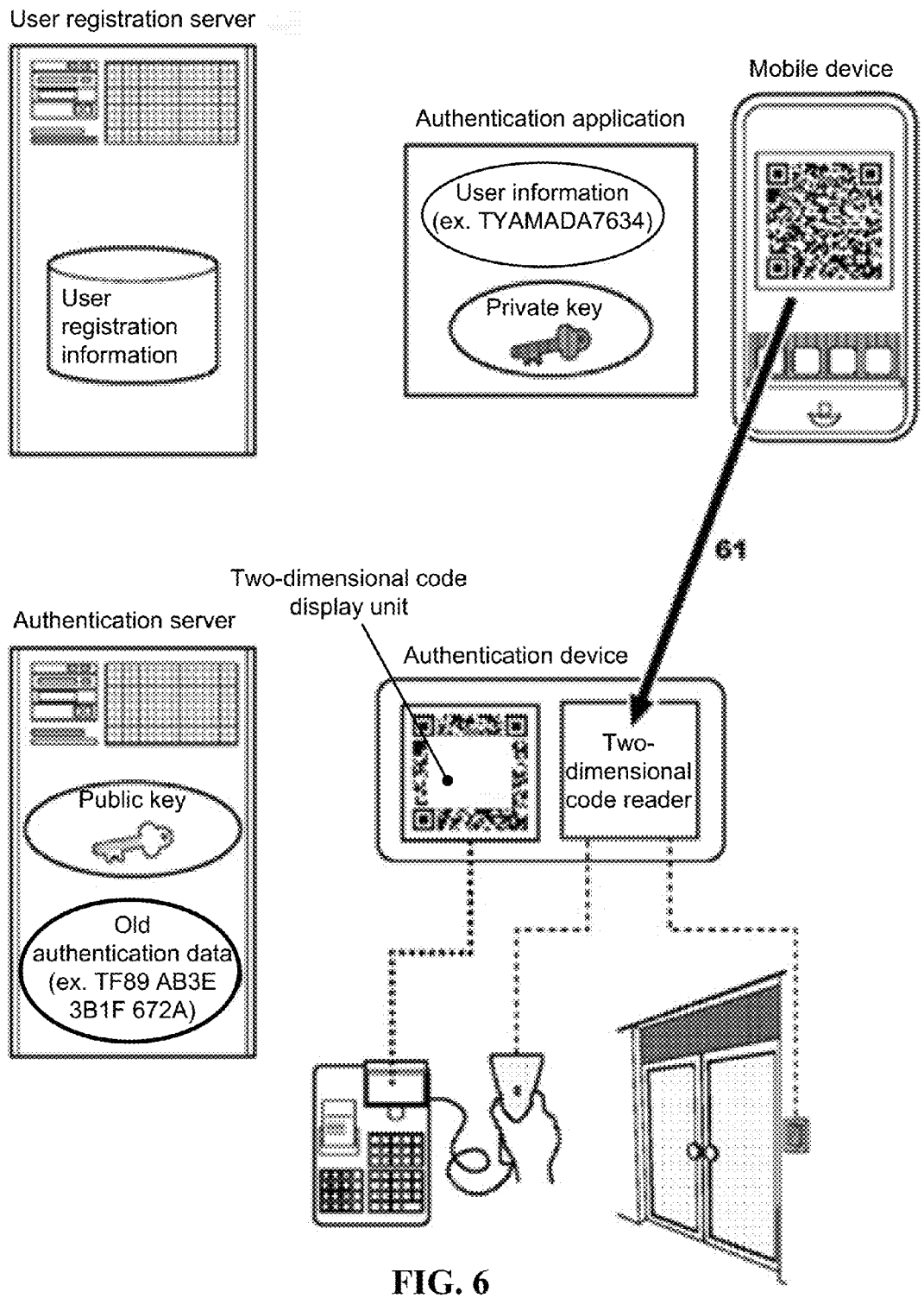
FIG. 6 shows an example of the procedure in the present disclosure for having a two-dimensional code reading unit in an authentication device read the two-dimensional code B on the mobile device.

FIG. 6 shows an example of the procedure in the present disclosure for having a two-dimensional code reading unit in an authentication device read the two-dimensional code B on the mobile device. In 61, the user allows the two-dimensional code B reading unit in the authentication device to read the two-dimensional code B on the mobile device.

Figure 7:
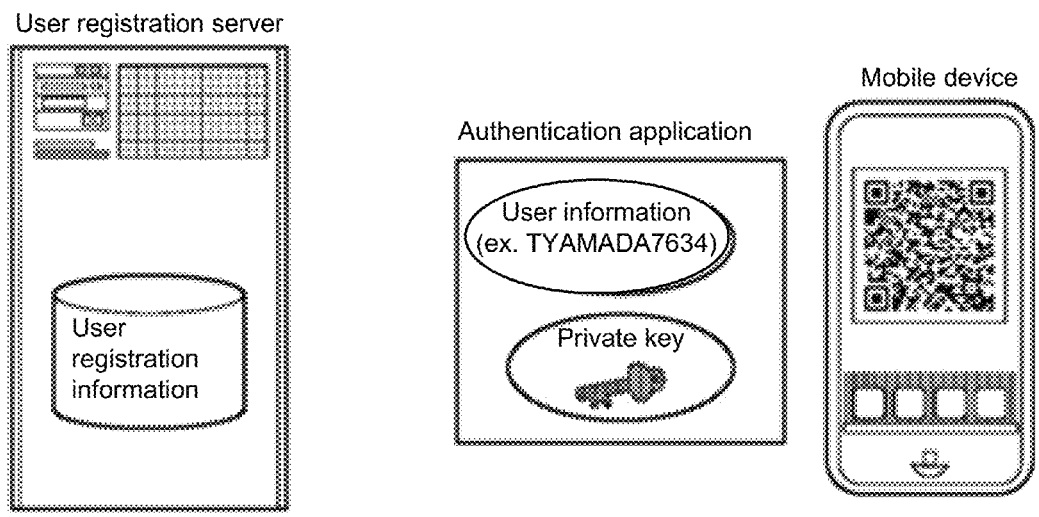
FIG. 7 shows an example of the procedure in the present disclosure for sending the read two-dimensional code B to an authentication server.
Figure 7:
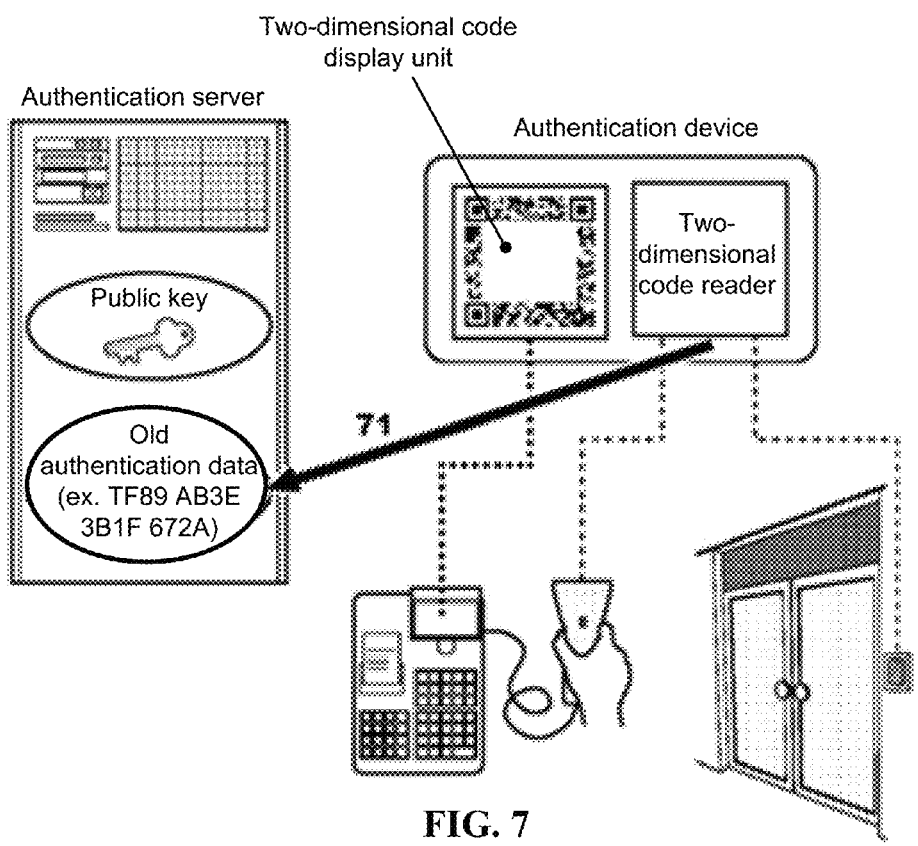

FIG. 7 shows an example of the procedure in the present disclosure for sending the read two-dimensional code B to an authentication server. In 71, the authentication device sends the two-dimensional code B to the authentication server.

Figure 8:
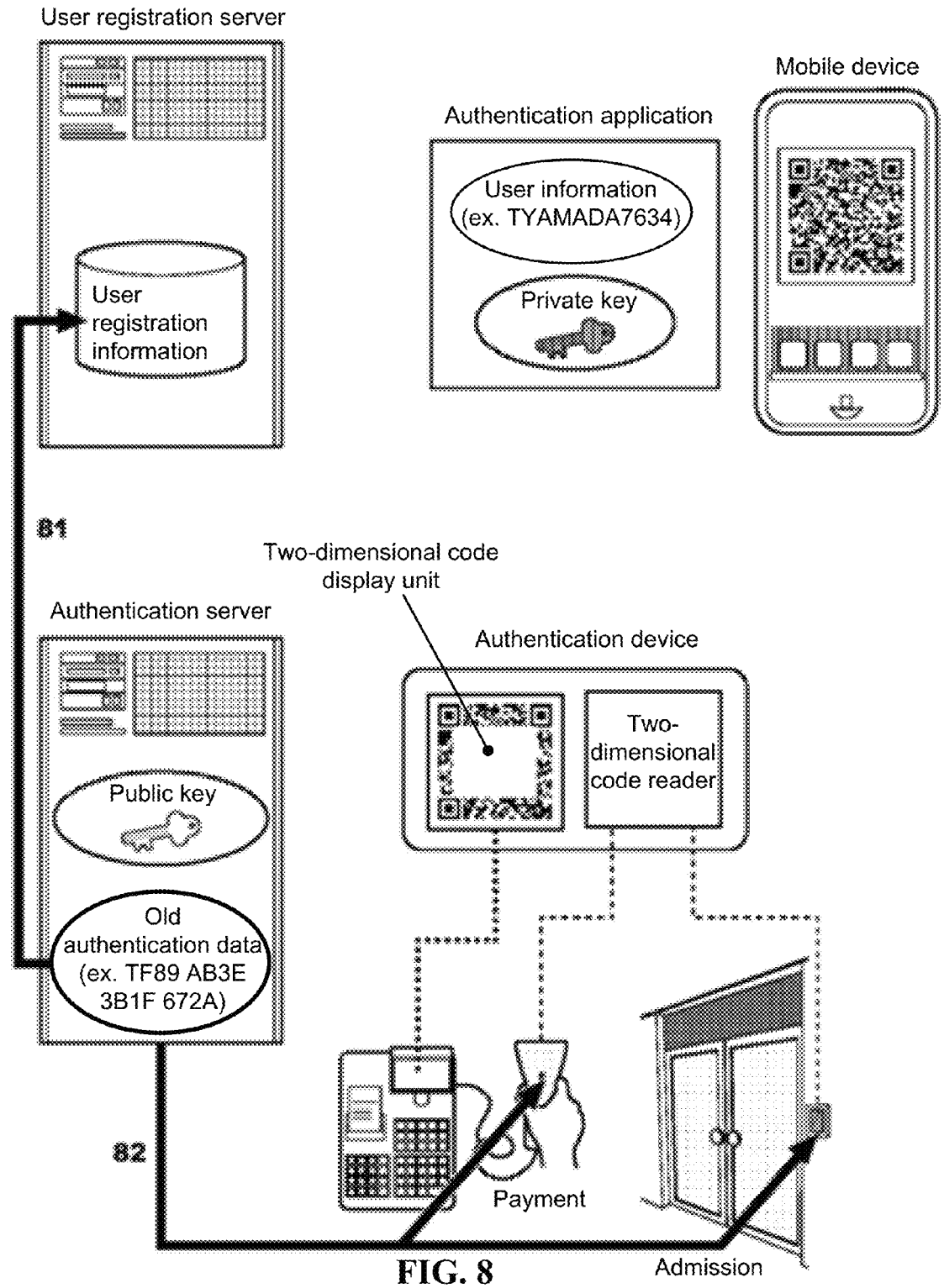
FIG. 8 shows an example of the procedure in the present disclosure for authenticating a person when, for example, admission has been paid.

FIG. 8 shows the procedure in the present invention for authenticating a person when, for example, admission has been paid. The authentication server confirms that two-dimensional code B includes the original authentication data. In 81 and 82, the user registration server is queried when a match has been confirmed, the user information in two-dimensional code B is matched with the user registration information, and an entrance door is opened or a payment is settled when there is a match. The original authentication data is updated each time the authentication process has been completed, and is encrypted using a shared key in each case to serve as the new two-dimensional code A to be displayed.

Figure 9:
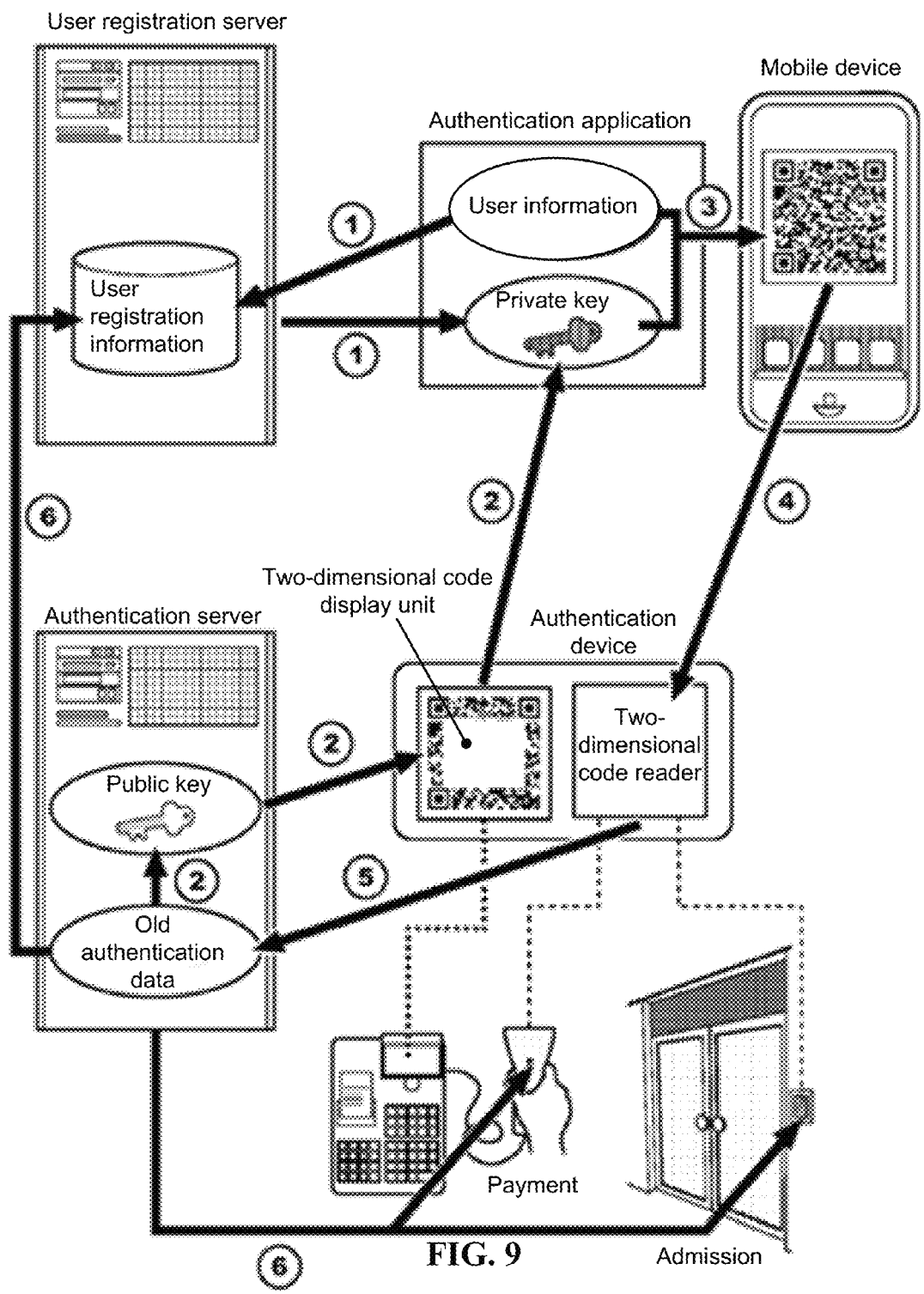
FIG. 9 depicts a diagram that illustrates a method of the disclosed, according to embodiments.

FIG. 9 depicts a diagram that illustrates a method of the disclosed, according to embodiments. For example, the figure may be summarizing in (1) through (6) the entire operational flow explained separately in FIG. 3 (explaining step 1), FIG. 4 (explaining step 2), FIG. 5 (explaining step 3), FIG. 6 (explaining step 4), FIG. 7 (explaining step 5), and FIG. 8 (explaining step 6). An encryption/decryption library is provided by the Open Source QR Code Library of the Open Source Project. The "two-dimensional codes" mentioned herein are encrypted codes that are decodable or decipherable. Any combination of "public key" and "private key" can be applied to the technical concept of the present disclosure. The present disclosure can be realized as a computer program which executes in a computer the steps of the method described above. The authentication device, authentication server, authentication application, and user registration server can be realized in a system including any combination of these operational units. The division of the explanation into an authentication device, authentication server, authentication application, and user registration server is for convenience only and these devices are merely expressions used to clarify different roles. It should be clear to a person of skill in the art that the various roles in the technical concept of the present disclosure can be assigned and realized differently.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. The method comprising:

accessing, from an authentication server, original authentication data;

generating, by encrypting the original authentication data, a first image, the first image being a first two-dimensional code image;

displaying, on a display unit, the first image, the first image configured to be read by a mobile device;

reading a second image from the mobile device, the second image being a second two-dimensional code image and generated by an authentication application in response to the authentication application having decrypted the first image, and the authentication application having combined data from the decrypted first image with registered user information;

determining that the second image includes the original authentication data; and determining the registered user information in the second image matches server registered user information from a user registration server.

2. The method of claim 1, wherein the second image is generated using a private key, the private key exchanged between the user registration server and the authentication application upon completion of entry of the registered user information.

3. The method of claim 1, further comprising updating, in response to the determining the registered user information in the second image matches the server registered user information from a user registration server, the original authentication data.

4. The method of claim 1, wherein the authentication application is on the mobile device.

* * * * *